United States Patent
Danilov et al.

(10) Patent No.: US 10,592,139 B2
(45) Date of Patent: Mar. 17, 2020

(54) EMBEDDED OBJECT DATA STORAGE DETERMINED BY OBJECT SIZE INFORMATION

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 49 days.

(21) Appl. No.: 15/992,784

(22) Filed: May 30, 2018

(65) Prior Publication Data
US 2019/0369890 A1 Dec. 5, 2019

(51) Int. Cl.
*G06F 3/06* (2006.01)
(52) U.S. Cl.
CPC .......... *G06F 3/0631* (2013.01); *G06F 3/0604* (2013.01); *G06F 3/067* (2013.01)
(58) Field of Classification Search
CPC ...... G06F 3/0631; G06F 3/0604; G06F 3/067; G06F 3/0629; G06F 3/0638; G06F 3/064; G06F 3/0667
See application file for complete search history.

(56) References Cited

U.S. PATENT DOCUMENTS

| | | | |
|---|---|---|---|
| 2008/0021865 A1* | 1/2008 | Corkill | G06F 16/221 |
| 2012/0317155 A1* | 12/2012 | Ogasawara | G06F 16/282 |
| | | | 707/812 |
| 2013/0086303 A1* | 4/2013 | Ludwig | G06F 21/00 |
| | | | 711/103 |
| 2018/0260465 A1* | 9/2018 | Hegde | G06F 16/2219 |

OTHER PUBLICATIONS

Techopedia, "Key-Value Pair (KVP)," available: https://www.techopedia.com/definition/13645/key-value-pair-kvp.*

* cited by examiner

*Primary Examiner* — Tracy A Warren
(74) *Attorney, Agent, or Firm* — Amin, Turocy & Watson, LLP

(57) ABSTRACT

The described technology is generally directed towards storing an object in different ways based upon evaluating the object's size information. An object classified as small with respect to a threshold size value is an embedded object, and has its object metadata and object data stored in an object table that generally references object data. A non-embedded object can be further classified based on its object metadata size, as a normal object (metadata size below a threshold size) or an inflated object (metadata size not below the threshold size). A normal object has its object data stored in a repository (in a chunk in a chunk store) and its object metadata and pointer to the chunk stored in the object table. An inflated object has its object metadata and object data stored in the repository (in a chunk) with a pointer to the chunk stored in the object table.

20 Claims, 12 Drawing Sheets

EMBEDDED OBJECT DATA STORAGE DETERMINED BY OBJECT SIZE INFORMATION

TECHNICAL FIELD

The subject application generally relates to data storage, and, for example, to a data storage system that stores objects in different ways based on object size data, and related embodiments.

BACKGROUND

Contemporary cloud-based data storage systems, such as Dell EMC® Elastic Cloud Storage (ECS™) service, store data in a way that ensures data protection while retaining storage efficiency. ECS is referred to as "elastic" storage because the data storage system is able to store arbitrary data sets having any amount of data of any size within the available physical storage capacity, without limitations enforced at the software level.

However, the ability to work with an arbitrary data set does not mean that data storage does not work differently with differently-sized data sets. In particular, small-sized objects have a high capacity overhead; for example, in ECS™, user data are stored in chunks, and basically have the same overhead as large objects stored in chunks, but with a relatively higher overhead-to-object-size ratio. Moreover, with small objects, it is highly impractical (or at least very difficult) to reclaim capacity at the chunk level or even at the chunk fragment level, without using copying garbage collection techniques, which in general are low performance techniques. Object grouping at the application side before storage is one possible solution; however such a solution, which would be up to the applications rather than the data storage system, has considerable penalties associated with it.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards storing data in different ways in a data storage system comprising data stored as objects and an object data structure (e.g., an object table). In one or more aspects, described herein is determining whether an object is an embedded object based on a result of evaluating whether a size of the object exceeds a first threshold size value. In response to the object being determined to be an embedded object, aspects comprise storing object metadata of the object and object data of the object in the object data structure. In response to the object being determined not to be an embedded object, aspects comprise storing at least part of the object in a chunk, and storing a pointer to the chunk in the object data structure.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
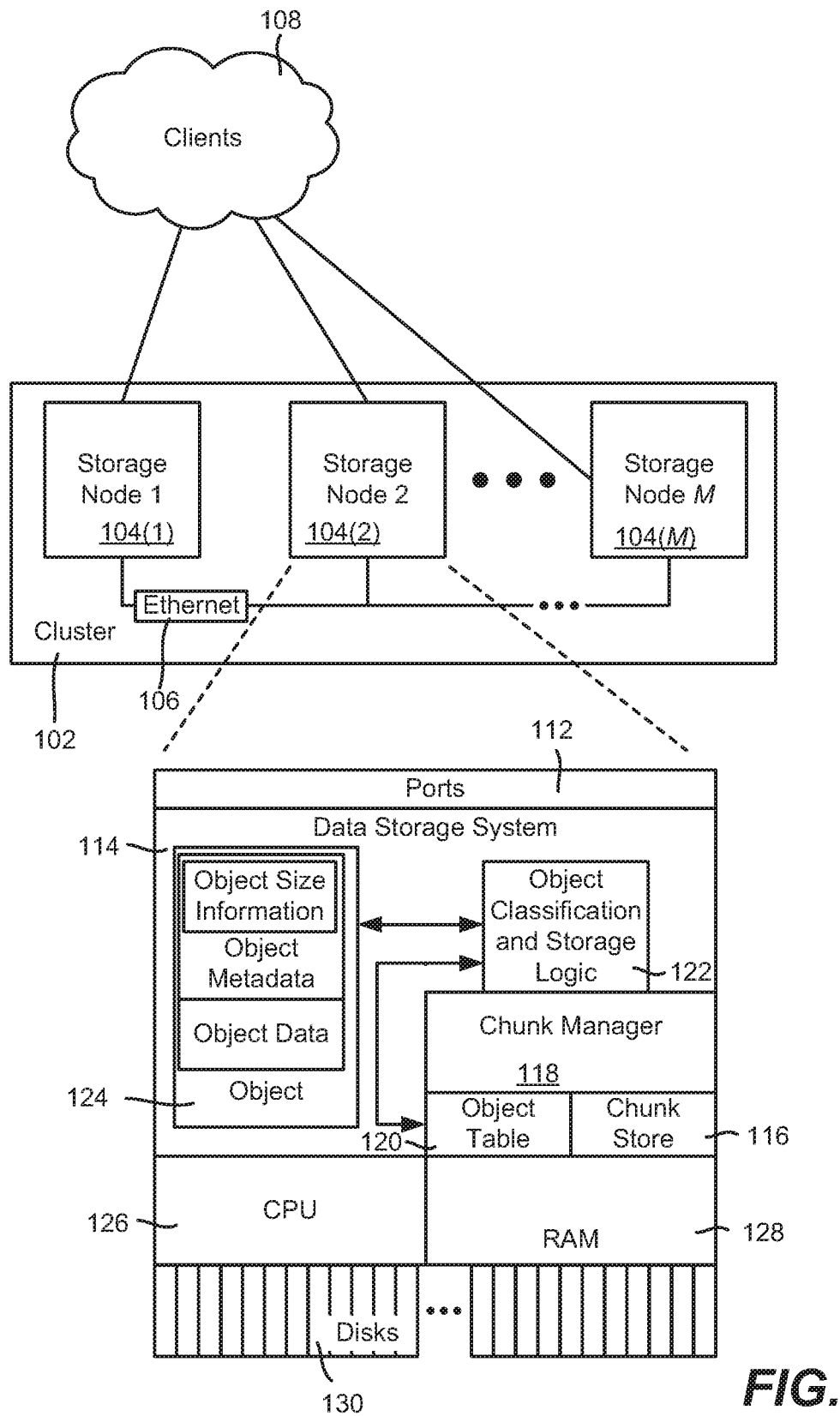
FIG. 1 is an example block diagram representation of part of a data storage system including nodes, in which objects are classified and stored based on size information, according to one or more example implementations.

Various aspects of the technology described herein are generally directed towards embedded objects, in which an embedded object has no stand-alone data segment(s) stored to chunks, but instead has its object metadata and object data stored in an object data structure (e.g., an object table). In general, an object is stored based on its size.

In one or more implementations, a data storage system defines a per object capacity threshold value. An object's size is compared to the threshold value, and the object is stored based on its size relative to the threshold value. Depending on the result, an object can be classified as (can belong to type) an embedded object (also referred to as a small object), a normal object, or an inflated object.

In general, small objects are those in which the total object size, comprising object data and object metadata considered together are below the threshold value. Normal objects are those in which total size comprising object data and object metadata together are above (or equal to) the threshold, but the object metadata size considered alone is below the threshold value. Inflated objects are those in which the object metadata size, considered alone, is above (or equal to) the threshold value.

In one or more implementations, the system stores these different object types differently, in that entire small objects, comprising their object data and object metadata, are stored to the object table, e.g., in one piece. As a result, the object table need not contain object location information, e.g., there is no pointer to a chunk. Normal objects are stored such that the object table contains object metadata, plus data location information, e.g., a pointer to the object data, which is stored to one or more chunk(s). Inflated objects have their object data and object metadata stored to one or more chunk(s) (e.g., in one piece), with only a pointer to the data location stored in the object table. Note that the pointer is generally not considered object metadata, but alternatively can be thought of a metadata exception, in that pointers are stored in the object table.

As will be understood, the above implementation(s) are non-limiting examples, and variations to the above technology can be implemented. For example, two threshold values, one for total size evaluation and another for metadata size evaluation can be used. As another example, some object data for normal objects can be stored in the object table, and/or some metadata for inflated objects can be stored in the object table.

Indeed, it should be understood that any of the examples herein are non-limiting. For instance, some of the examples are based on ECS™ cloud storage technology; however virtually any storage system may benefit from the technology described herein. Thus, any of the embodiments, aspects, concepts, structures, functionalities or examples described herein are non-limiting, and the technology may be used in various ways that provide benefits and advantages in computing and data storage in general.

FIG. 1 shows part of a cloud data storage system such as ECS™ comprising a zone (e.g., cluster) 102 of storage nodes 104(1)-104(M), in which each node is typically a server configured primarily to serve objects in response to client requests. The nodes 104(1)-104(M) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

In general, and in one or more implementations, e.g., ECS™, disk space is partitioned into a set of relatively large blocks of fixed size (e.g., 128 MB) referred to as chunks; user data is generally stored in chunks, e.g., in a user data repository. Normally, one chunk contains segments of several user objects. In other words, chunks can be shared, that is, one chunk may contain segments of multiple user objects; e.g., one chunk may contain mixed segments of some number of (e.g., three) user objects.

Each node, such as the node 104(2), includes an instance of a data storage system 114 and data services; (note however that at least some data service components can be per-cluster, rather than per-node). For example, ECS™ runs a set of storage services, which together implement storage business logic. Services can maintain directory tables for keeping their metadata, which can be implemented as search trees. A blob service can maintain an object table that keeps track of objects in the data storage system 114 and generally stores their metadata, including an object's data location within a chunk. There is also a "reverse" directory table (maintained by another service) that keeps a per chunk list of objects that have their data in a particular chunk.

FIG. 1 generalizes some of the above concepts, in that the user data repository of chunks is shown as a chunk store 116, managed by a chunk manager 118. An object table 120 maintains information about objects, including pointers to chunks. Further, as described herein, object classification and storage logic 122 is coupled to the object table 120 and the chunk manager 118 to determine how an object (e.g., the object 124) are to be stored between the object table 120 and/or chunk store 116 based on their classification type, e.g., embedded (small), normal or inflated.

In FIG. 1, a CPU 126 and RAM 128 are shown; note that the RAM 128 may comprise at least some non-volatile RAM. The node includes storage devices such as disks 130, comprising hard disk drives and/or solid-state drives. As is understood, any node data structure such as an object, object table, chunk, code, and the like can be in RAM 128, on disk(s) 130 or a combination of partially in RAM, partially on disk, backed on disk, replicated to other nodes and so on.

Figure 2:
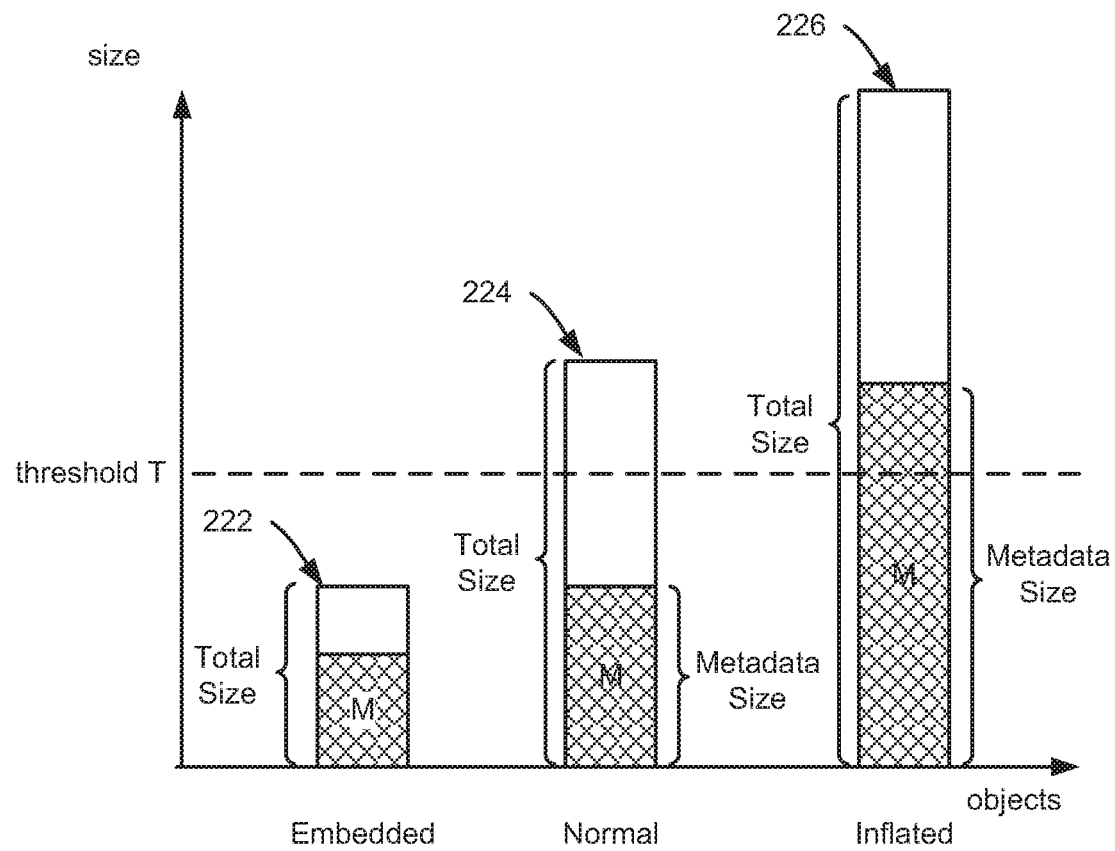
FIG. 2 is a representation of object size versus a classification threshold, according to one or more example implementations.

As represented in FIG. 2, the object classification and storage logic 122 (FIG. 1) classifies an object based on its size information, and works with the data storage system 114 to store that object based on its classification. In general, if the total object size (comprising object metadata plus object data) is below a threshold value, the object is considered an "embedded" object; as will be understood, embedded objects are stored in the object table 120 (FIG. 1). Otherwise, at least part of the object is stored in a chunk in the chunk store 116. Note that as used herein, "below" (or "above") can include the term "equal to" if the threshold value is a whole number and the size information is similarly measured in whole number, e.g., in bytes. A threshold can be set to a fractional number such that a size in bytes is always either above or below the threshold value. For purposes of simplicity herein, below generally refers to below, while above refers to equal to or above; increasing a whole number threshold value by one accomplishes the same effect as changing to an "equal to or below" equivalent.

Classifying based on above or below total size, by itself, is sufficient to provide benefits with respect to storage of relatively small objects, such as those having a total size on the order of less than 10 KB or whatever the system administrator sets for the threshold value (e.g., around 15-20 KB). Notwithstanding, in one or more implementations, further classification can be performed. To this end, if the total object size is not below (is equal to or above) the threshold value, then the object can be further classified as either a "normal" object or an "inflated" object. To this end, a normal object is one whose metadata size is below the threshold value; otherwise the object is classified as an inflated object.

Thus, in FIG. 2, the object 222 is an embedded object because its total size is below the threshold value T, and the object 224 is a normal object because its total size is above the threshold value T but its metadata size is below the threshold value T. The object 226 is an inflated object because its total size is above the threshold value T and its metadata size is above the threshold value T.

It should be noted that the threshold value for evaluating the total size need not be the same as the threshold value for evaluating the metadata size. For example, in an alternative implementation represented in FIG. 3, a first threshold value T1 is used to determine that the object 322 is an embedded object, and that the objects 324 and 326 are not embedded objects. As a further classification, a second threshold value T2 is used to determine that the object 324 is a normal object (metadata size below T2) and the object 326 is an inflated object (metadata size above T2). As will be understood, this allows more classification flexibility, such as to better control how much data gets stored within the object table versus the chunk store. Note that if the data storage system thresholds are set (e.g., by an administrator) such that T1 equals T2, the implementation(s) represented in FIG. 2 is provided.

Note that a threshold value can be changed at any time by an administrator. The changed threshold value can be applied to new objects (including updated objects) only, leaving existing, unchanged objects stored as is. Alternatively, the changed threshold value can be applied to new/updated objects as well as to reclassify existing, unchanged objects if desired, (if resources are available to perform retroactive classification, which may be done in small sets over time).

Figure 4:
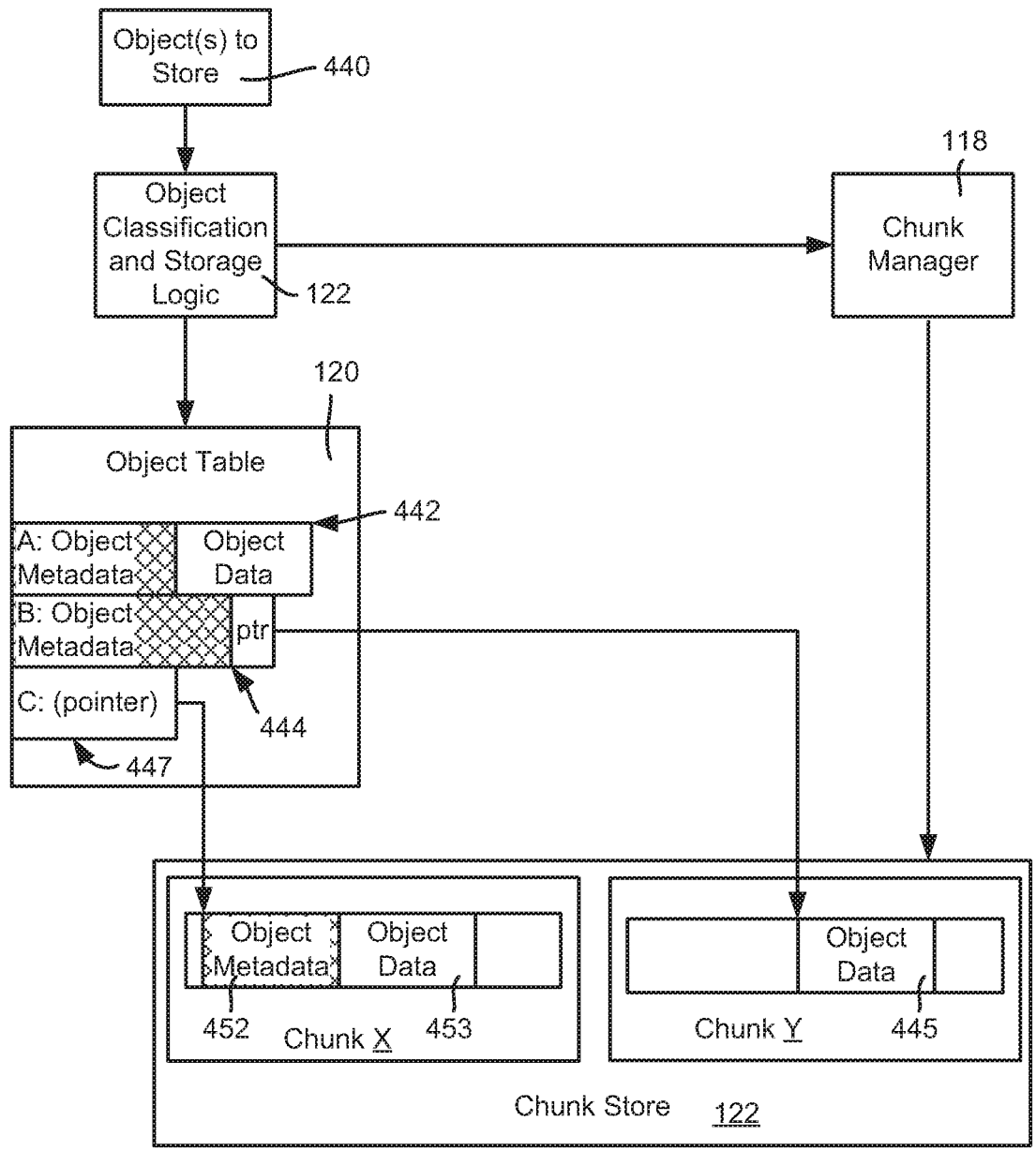
FIGS. 4-6 are block diagram representations of how different types of objects can be stored in an object table and/or in chunks, according to one or more example implementations.

As generally represented in FIG. 4, once classified by the object classification and storage logic 122, an object to store 440 is stored based on its classification. An embedded object has its object metadata and object data stored as an entry in the object table 120, shown as object 442 (corresponding to entry A) in FIG. 4. As can be readily appreciated, when small enough, storing an entire object in the object table 116 is highly efficient for small objects, as no chunk storage is needed, meaning no access via a pointer is needed, no chunk-based copying garbage collection is needed, and so on.

If further classification based-storage is desired, that is, differentiation between normal objects and inflated objects is performed, then normal objects can be stored differently from inflated objects. In the implementation represented in FIG. 4, for a normal object (corresponding to entry B), the object metadata 444 is stored in the object table 120, and (as referenced via a pointer ptr), the object data 445 is stored (e.g., by invoking the chunk manager 118) in a chunk Y in the chunk store 122. For an inflated object (corresponding to entry C), only a pointer 447 to the object metadata 452 is stored in the object table, with both the object metadata 452 and the object data 453 stored in a chunk X. Note that although not explicitly shown, it is understood that a normal object's data and an inflated object's metadata and object data can be stored in the same chunk with one another, as well as with other object data and/or metadata.

Figure 5:
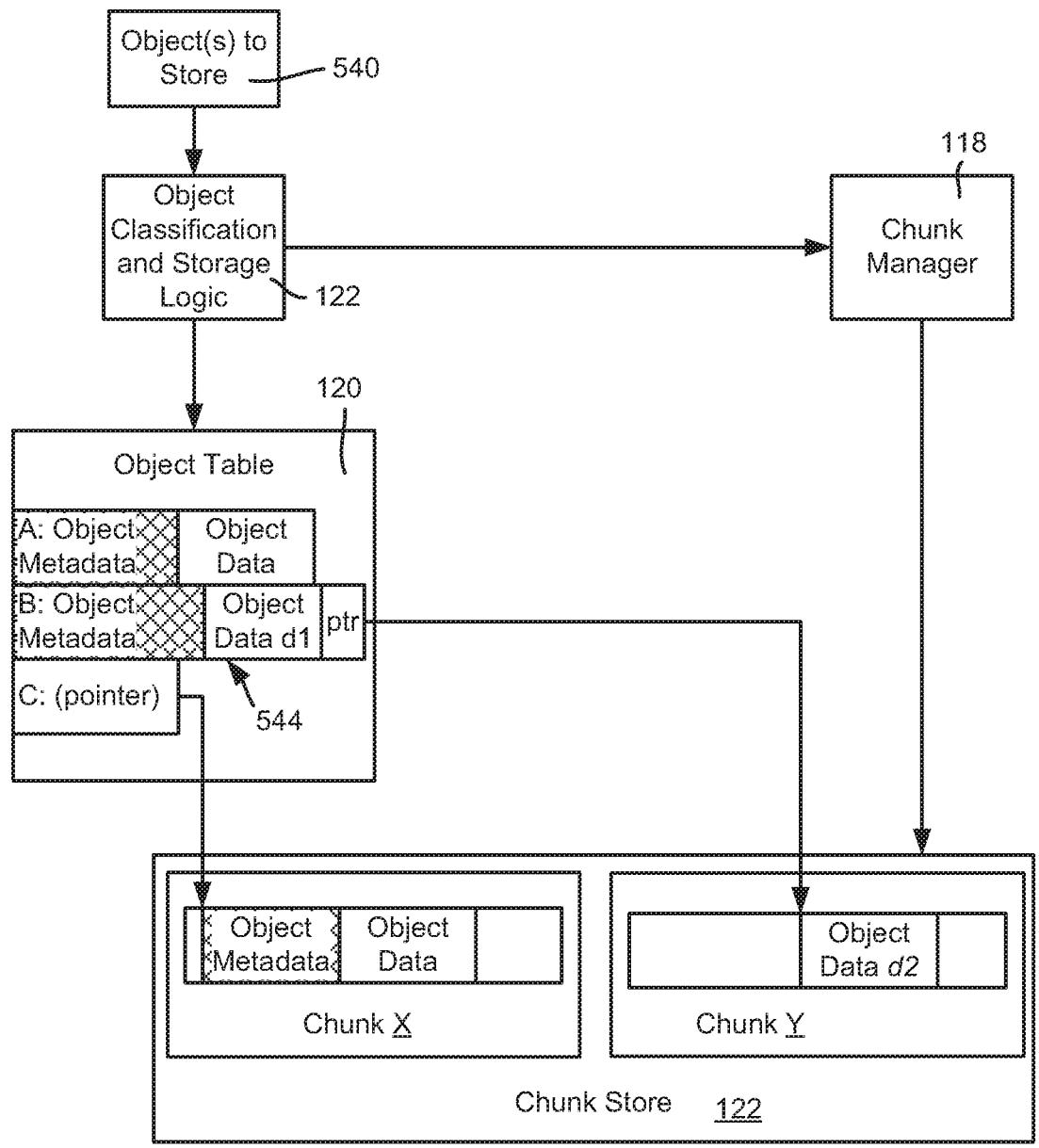

FIG. 5 shows one possible alternative implementation in which for a normal object 544 (entry B), some of the object data (d1) is maintained in the object table 120, while the rest of the object data (d2) is maintained in a chunk. In some scenarios, it may be efficient to have access to some object data without accessing the chunk store. For example, email message data (or other application program data) can offer some of the data (e.g., some number of characters) as available for preview; this preview portion can be maintained in the object table for quick access and display, with the remainder of the data accessible via the chunk store if the user selects the message for full viewing.

Note that an object may change its type as a result of one or multiple updates. The system can change the location of such an object's data and metadata accordingly, whenever possible. For example, when because of a data update an object grows from an embedded object to a normal object, some of the data can be maintained in the object table and some in the chunk store, e.g., in a temporary state until a full transition to a normal object is later performed, if desired, (e.g., return to the alternative of FIG. 4 for such a normal object).

Figure 6:
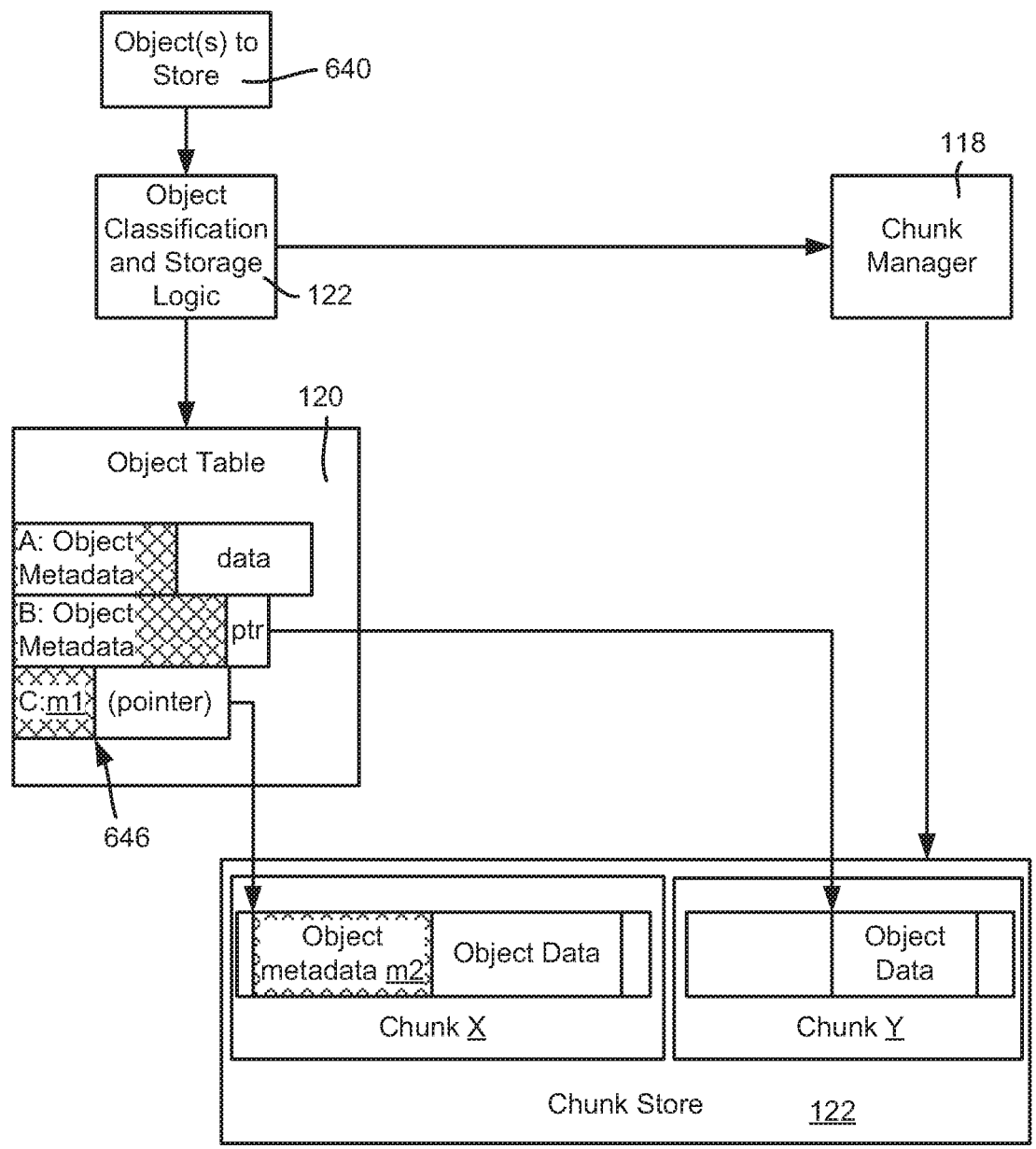

FIG. 6 shows another possible alternative implementation in which for an inflated object 646 (entry C), some of the object metadata (m1) is maintained in the object table 120, while the rest of the object metadata (m2) is maintained in a chunk X. This may be useful for certain scenarios, such as to rapidly display a directory or search a namespace based on commonly-needed metadata, such as name, date modified, size and so on, without needing to access the chunk store for such information. More detailed metadata m2 can be accessed via the pointer to the chunk X in the chunk store.

FIG. 6 some, rather than all, metadata in object table; list of files in a namespace can have "key" metadata in object table, only if need more metadata need to access chunk store. Also, this can be a useful temporary state if the object metadata grows, e.g., restore to the alternative in FIG. 4 when resources allow.

Although not explicitly shown, a hybrid of the alternatives of FIGS. 5 and 6 can be implemented, e.g., with split object data as in FIG. 5, and split metadata as in FIG. 6, even if only temporary. As is understood, as long as following the pointers allows recreating the entire object when needed, any full or partial (split) object metadata and/or object data solution can be employed.

Figure 7:
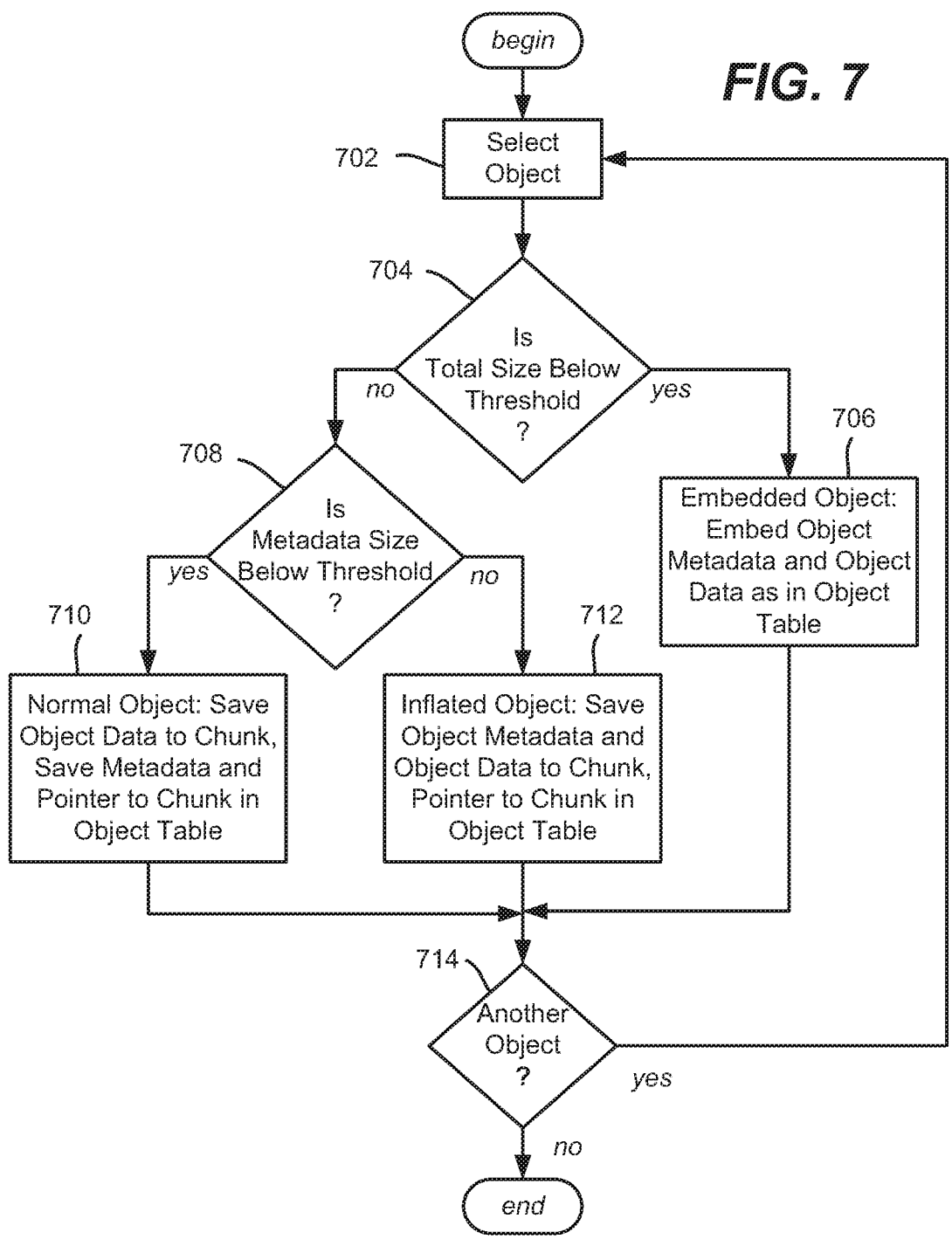
FIG. 7 is a flow diagram representing example operations for classifying an object based on object size information according to a threshold value, according to one or more example implementations.

FIG. 7 shows example logic for classifying and storing an object based on its object size information, and in general corresponds to the implementations of FIGS. 2 and 4. Note that FIG. 7 can apply to a single object to be stored, but can also apply to any set of multiple objects to be stored, including objects that need to be reclassified, e.g., because of updates. Note that for multiple objects to classify and store, different instances of FIG. 7 can be run in parallel, at least in part.

Operation 702 represents selecting an object, which then has its total size evaluated again the threshold value for classification at operation 704. If the total size is below the threshold at operation 704, then at operation 706 the object is classified as an embedded object, and stored (embedded) into the object table, including both object metadata and object data.

If the total size is not below the threshold at operation 704, then at operation 708 the object is further classified at operation 708 based on whether the object's metadata size is below the threshold. If so, at operation 710 the object is classified as a normal object, with its data stored in a chunk, and its object metadata (and a pointer to the chunk) stored in the object table. As is understood, operation 710 can be modified in a straightforward way to instead store the object data as split in some way, as in the alternative example implementation of FIG. 5.

Otherwise at operation 708 the object's metadata size is not below the threshold, and the object is classified as an inflated object at operation 712. As described herein with reference to the implementation of FIG. 4, such an object has its object metadata and its object data stored in a chunk, with a pointer to the chunk stored in the object table. As is understood, operation 712 can be modified in a straightforward way to instead store the object metadata as split in some way, as in the alternative example implementation of FIG. 6.

Operation 714 repeats the process for any other object or objects to be classified and stored, assuming the process is being run on more than one object, e.g., if performing retroactive classification or reclassification. Note that for multiple objects any stopping criterion or criteria may be employed, e.g., classify groups of n objects, where for example n can be dependent on currently available resources, a percentage, time of data, and so on, classify for x time duration, or the like.

Figure 3:
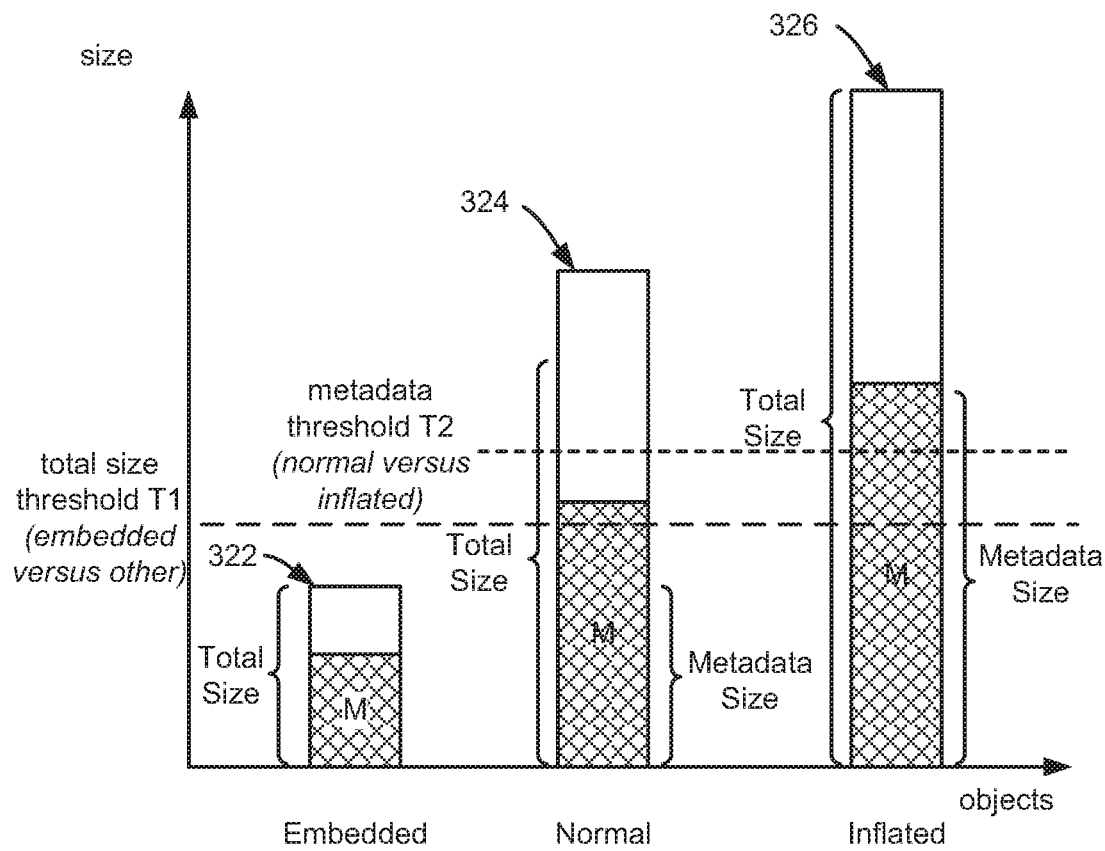
FIG. 3 is a representation of object size versus object classification thresholds, according to one or more example implementations
Figure 8:
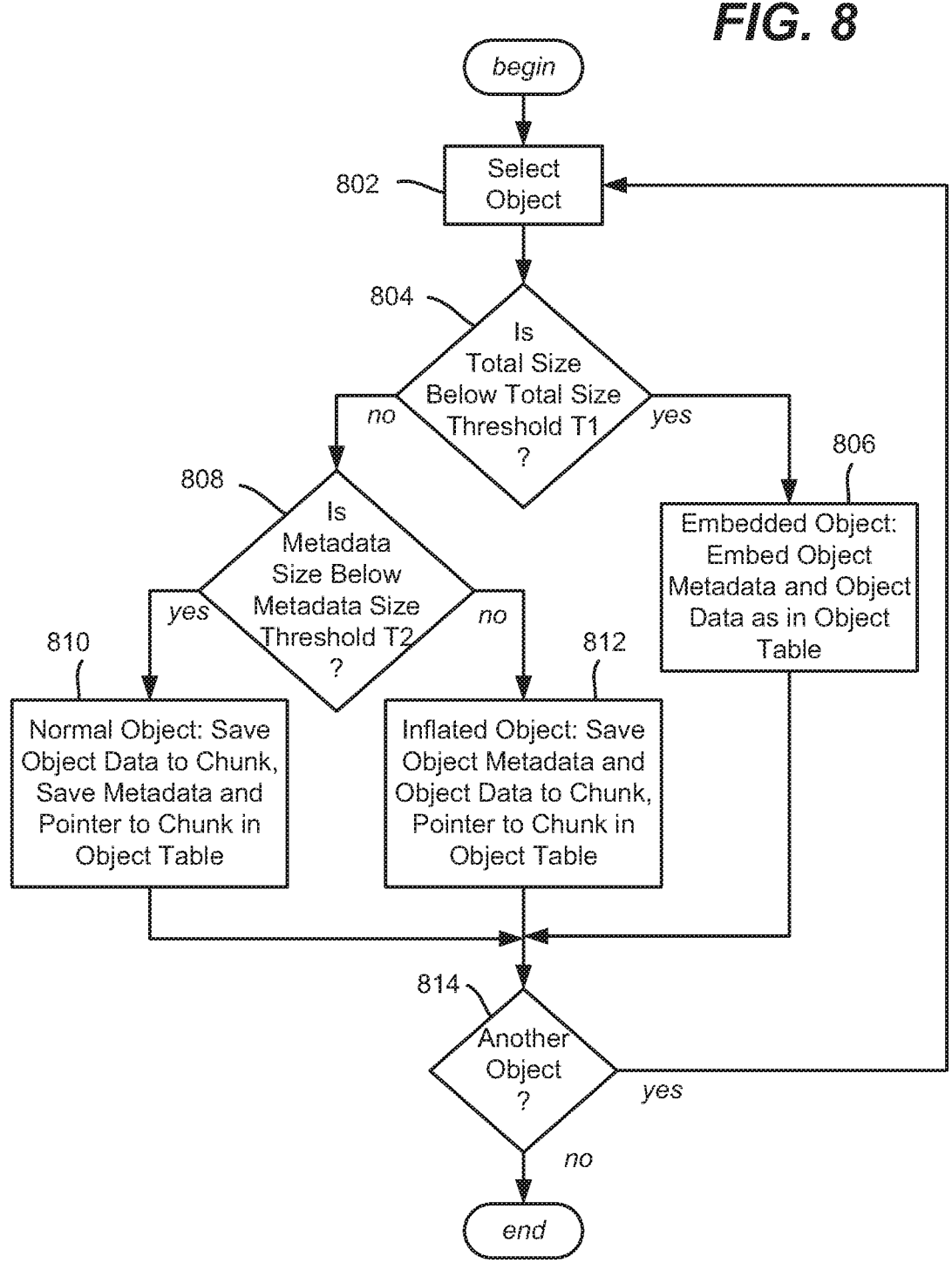
FIG. 8 is a flow diagram representing example operations for classifying an object based on object size information according to two threshold values, according to one or more example implementations.

FIG. 8 is similar to FIG. 7, except that two possibly different threshold values can be used, such as corresponding to the implementations of FIGS. 3 and 4. Thus, operations 804 and 808 allow for two threshold values, one T1 for total size (operation 804), and another T2 for metadata size (for non-embedded objects). Operations 806, 810, 812 and 814 are generally the same as operations 706, 710, 712 and 714 of FIG. 7 and are not described again for purposes of brevity.

Figure 9:
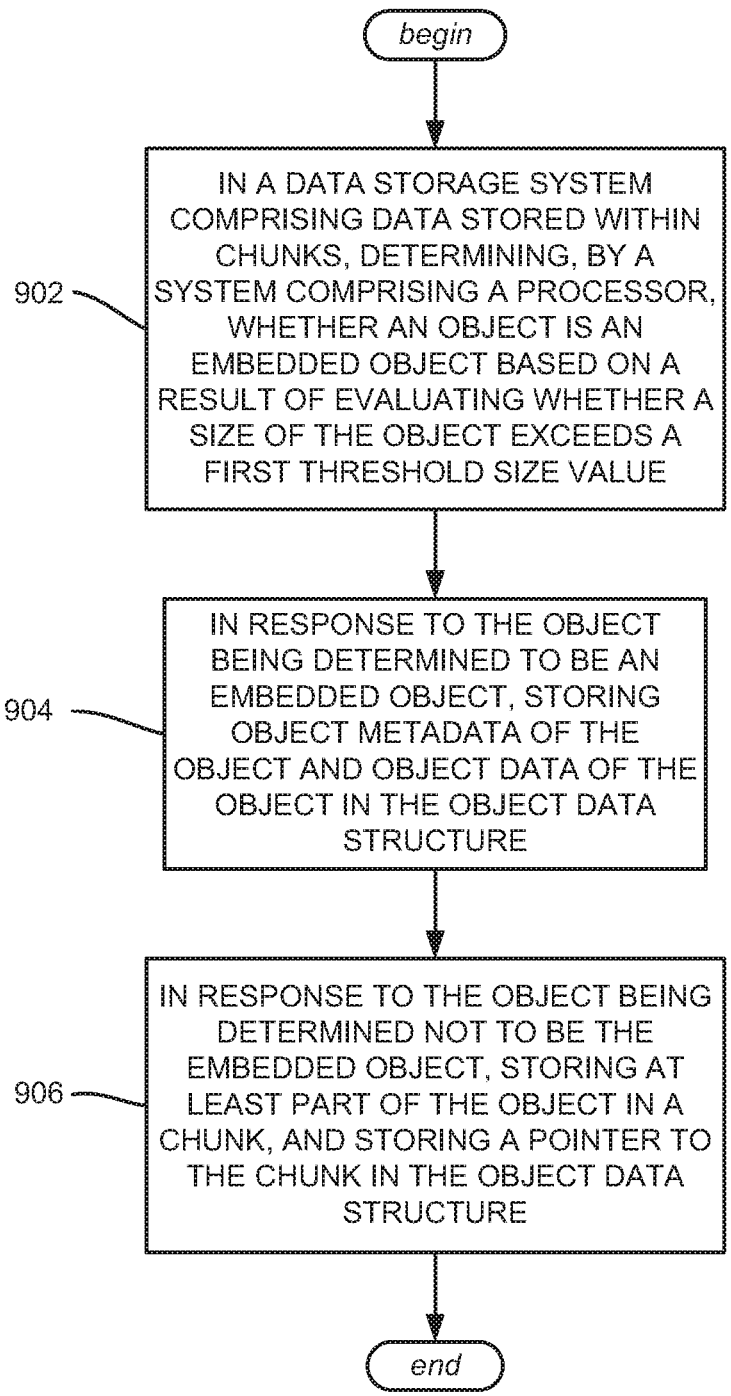
FIG. 9 is an example flow diagram showing example operations related to object size classification and object storage, according to one or more example implementations.

One or more aspects are represented as example operations in FIG. 9, and operate a data storage system comprising data stored as objects and an object data structure. Example operations comprise, determining operation (902), e.g., by a system comprising a processor, whether an object is an embedded object based on a result of evaluating whether a size of the object exceeds a first threshold size value. Operation 904 represents, in response to the object being determined to be an embedded object, storing object metadata of the object and object data of the object in the object data structure. Operation 906 represents, in response to the object being determined not to be the embedded object, storing at least part of the object in a chunk, and storing a pointer to the chunk in the object data structure.

When the object is determined to be the embedded object, storing the object metadata of the object and the object data of the object in the object data structure can comprise storing the object metadata of the object and the object data of the object in a single entry within the object data structure.

The result can be a first result, and the object can be determined not to be the embedded object; aspects can comprise determining whether the object is a normal object or an inflated object based on a second result of evaluating whether a size of the object metadata exceeds a second threshold size value. When the object is a normal object, storing at least the part of the object to the chunk can comprise storing the object metadata of the object in the object data structure in association with the pointer to the chunk, and storing the object data of the object in the chunk. When the object is an inflated object, storing at least the part of the object to the chunk can comprise storing at least part of the object metadata of the object in the chunk. When the object is an inflated object, storing at least the part of the object to the chunk can comprise storing the object metadata of the object in the chunk and storing the object data in the chunk.

Figure 10:
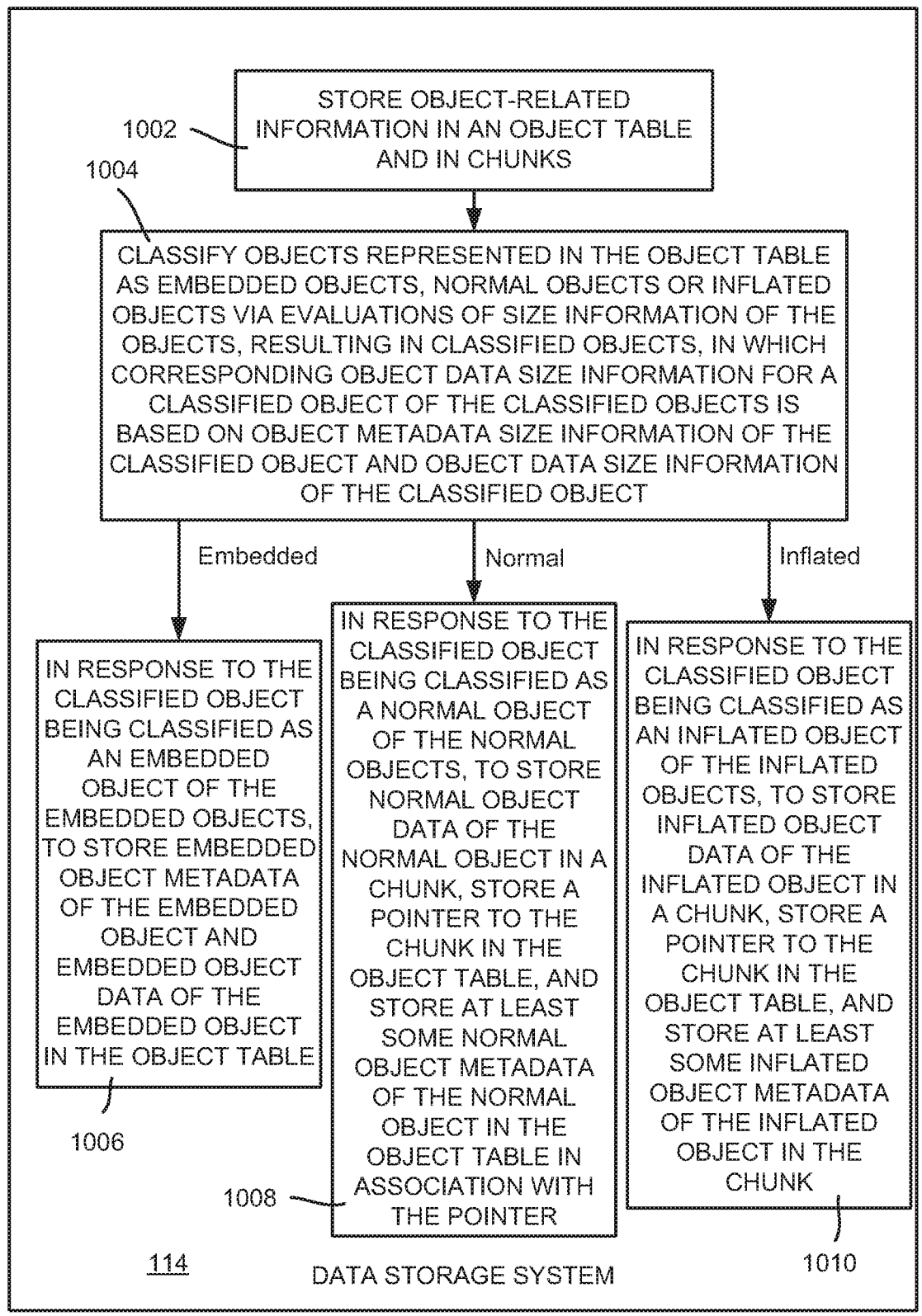
FIG. 10 is an example block diagram showing example logic components of a data storage system that stores objects based on size classification, according to one or more example implementations.

One or more aspects, generally exemplified in FIG. 10, can comprise a data storage system 114. The data storage system 114 can be configured (block 1002) to store object-related information in an object table and in chunks, and classify (block 1004) objects represented in the object table as embedded objects, normal objects or inflated objects via evaluations of size information of the objects, resulting in classified objects, in which corresponding object data size information for a classified object of the classified objects is based on object metadata size information of the classified object and object data size information of the classified object. As represented via block 1006, in response to the classified object being classified as an embedded object of the embedded objects, the data storage system can store embedded object metadata of the embedded object and embedded object data of the embedded object in the object table. As represented via block 1008, in response to the classified object being classified as a normal object of the normal objects, the data storage system can store normal object data of the normal object in a chunk, store a pointer to the chunk in the object table, and store at least some normal object metadata of the normal object in the object table in association with the pointer. As represented via block 1010, in response to the classified object being classified as an inflated object of the inflated objects, the data storage system can store inflated object data of the inflated object in a chunk, store a pointer to the chunk in the object table, and store at least some inflated object metadata of the inflated object in the chunk.

The corresponding object data size information of the classified object, comprising the object metadata size information in conjunction with the corresponding object data size information of the classified object, can indicate a total object size below a threshold size value, and the data storage system can classify the classified object as the embedded object.

The corresponding object data size information of the classified object, comprising the object metadata size information, can indicate an object metadata size below a threshold size value, and the data storage system can classify the classified object as the normal object. The data storage system can store all or substantially all of the object metadata of the normal object in the object table in association with the pointer.

The corresponding object data size information of the classified object, comprising the object metadata size information, can indicate an object metadata size above a second threshold size value, and the data storage system can classify the classified object as the inflated object. The data storage system can store all or substantially all of the object metadata of the inflated object in the chunk. The data storage system can store at least part of the object metadata of the inflated object in the object data structure.

The corresponding object data size information of the classified object, comprising the object metadata size information in conjunction with the corresponding object data size information of the classified object, can indicate a total object size above a first threshold size value, and can further indicate an object metadata size below a second threshold size value, and the data storage system can classify the classified object as the normal object. The first threshold size value can be equal to the second threshold size value.

The corresponding object data size information of the classified object, comprising the object metadata size information in conjunction with the corresponding object data size information of the classified object, can indicate a total object size above a first threshold size value, and the corresponding object data size information of the classified object, comprising the object metadata size information, can indicate an object metadata size above a second threshold size value, and the data storage system can classify the classified object as the inflated object. The first threshold size value can be equal to the second threshold size value.

Figure 11:
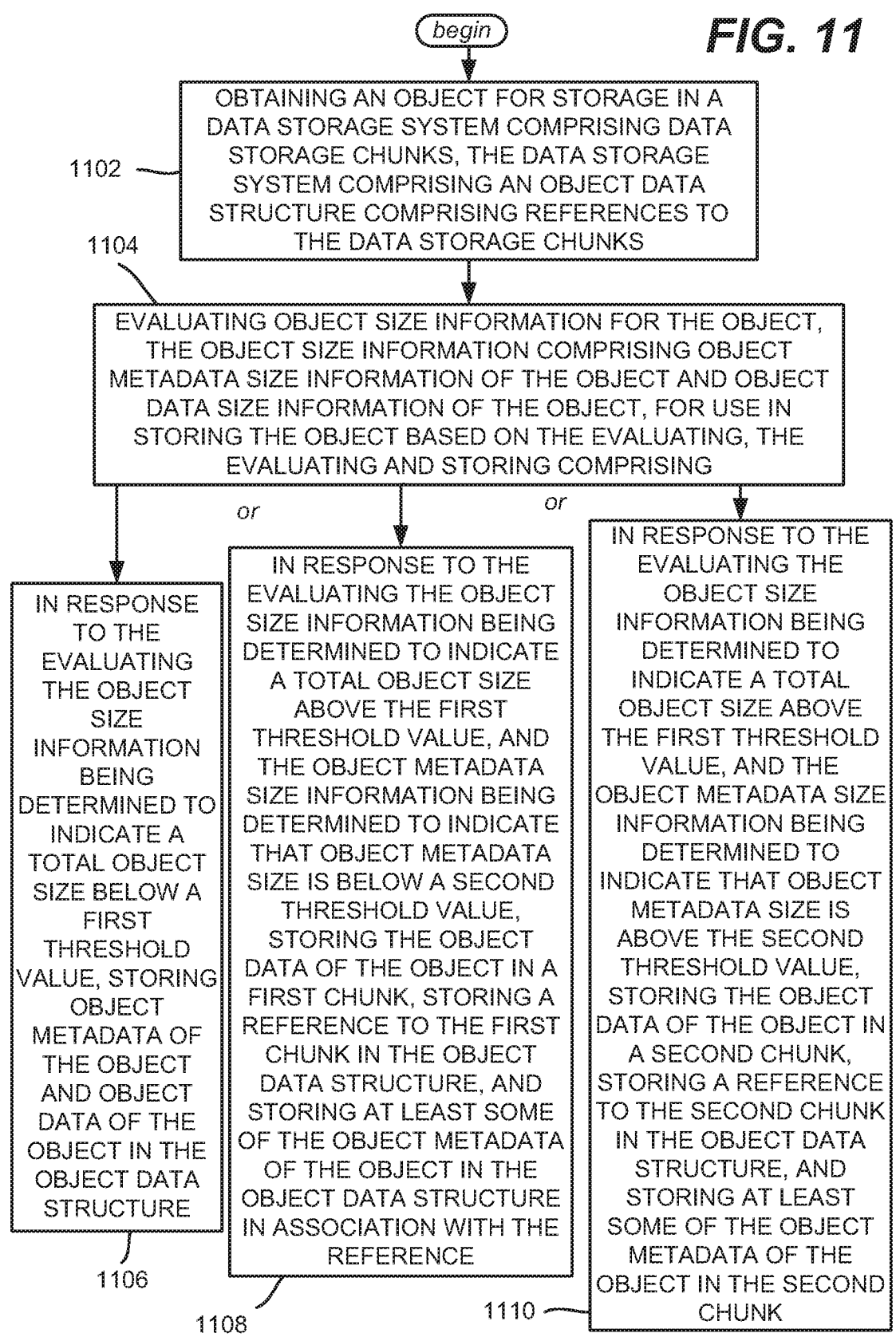
FIG. 11 is an example flow diagram showing example operations related to object size classification and object storage, according to one or more example implementations.

One or more aspects, such as implemented in a machine-readable storage medium, comprising executable instructions that, when executed by a processor, facilitate performance of operations, can be directed towards operations exemplified in FIG. 11. Example operation 1102 represents obtaining an object for storage in a data storage system comprising data storage chunks, the data storage system comprising an object data structure comprising references to the data storage chunks. Example operation 1204 represents evaluating object size information for the object, the object size information comprising object metadata size information of the object and object data size information of the object, for use in storing the object based on the evaluating. The evaluating and storing can comprise example operations 1206, 1208 or 1210.

Example operation 1206 represents, in response to the evaluating the object size information being determined to indicate a total object size below a first threshold value, storing object metadata of the object and object data of the object in the object data structure. Example operation 1208 represents, in response to the evaluating the object size information being determined to indicate a total object size above the first threshold value, and the object metadata size information being determined to indicate that object metadata size is below a second threshold value, storing the object data of the object in a first chunk, storing a reference to the first chunk in the object data structure, and storing at least some of the object metadata of the object in the object data structure in association with the reference. Example operation 1210 represents, in response to the evaluating the object size information being determined to indicate a total object size above the first threshold value, and the object metadata size information being determined to indicate that object metadata size is above the second threshold value, storing the object data of the object in a second chunk, storing a reference to the second chunk in the object data structure, and storing at least some of the object metadata of the object in the second chunk.

Evaluating the object size information can indicate the total object size is above the first threshold value, and the object metadata size information can indicate that object metadata size is below the second threshold value, and storing at least some of the object metadata of the object in the object data structure in association with the reference can comprise storing all or substantially all of the object metadata of the object in the object data structure.

Evaluating the object size information can indicate the total object size is above the first threshold value, and the object metadata size information can indicate that the object metadata size is above the second threshold value, and storing at least some of the object metadata of the object in the chunk can comprise storing all or substantially all of the object metadata of the object in the chunk.

As can be seen, the technology described herein for classifying and storing small objects as embedded objects makes a data storage system more elastic. Example benefits include facilitating the reduction of system per object capacity overheads, e.g., as there is no need to keep location information for small objects residing in the object table. There is also no need to keep the identifier (object ID) in a reverse directory table for chunks.

The technology further decreases the average number of objects per chunk (or chunk fragment). As a result, there is higher statistical probability to reclaim a chunk (chunk fragment) without copying data. The co-location of data and metadata for small objects also improves read performance for embedded objects.

As one example, consider that two types of objects are often supported, comprising small clips and potentially large blobs, in which clips, which contain metadata, reference blobs, which contain actual data. The technology described herein thus in general can maintain half of such objects (the clips) in the object table.

As another example, consider archiving email, which is currently one of the most popular applications for cloud storage systems. With email archive, a significant part (often the majority) of individual objects are small (<10 KB), and can thus be arranged to be embedded objects by setting the total size threshold to a desired level.

Note that the technology described herein decreases the potential amount of work for the data (repository) garbage collector, but can potentially increase the amount of work for the tree (object table) garbage collector. However, the deletion of any object with a body of separate data produces workload for both garbage collectors, because the data garbage collector needs to reclaim capacity occupied by the object's body and the tree garbage collector needs to reclaim capacity occupied by the object's metadata. Therefore, both garbage collectors are already run in order to clean up such an object. For embedded objects, the garbage collection is done by the tree garbage collector alone and thus adds a little to the workload for the tree garbage collector; however, the total amount of work the system does is reduced because of less data garbage collection work.

Example Computing Device

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 12 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 12:
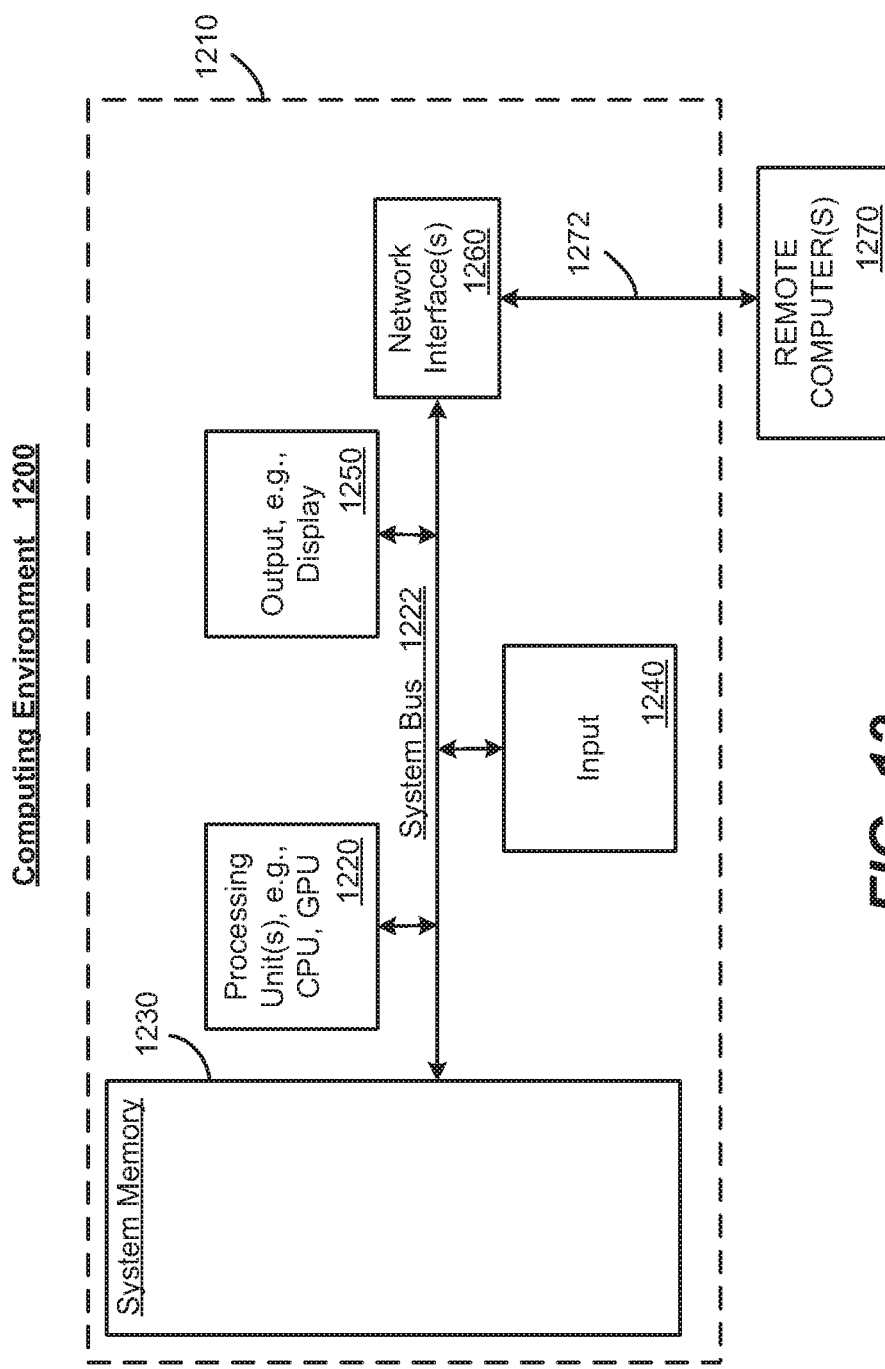
FIG. 12 is a block diagram representing an example computing environment into which aspects of the subject matter described herein may be incorporated.

FIG. 12 thus illustrates an example of a suitable computing system environment 1200 in which one or aspects of the implementations described herein can be implemented, although as made clear above, the computing system environment 1200 is only one example of a suitable computing environment and is not intended to suggest any limitation as to scope of use or functionality. In addition, the computing system environment 1200 is not intended to be interpreted as having any dependency relating to any one or combination of components illustrated in the example computing system environment 1200.

With reference to FIG. 12, an example device for implementing one or more implementations includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of machine (e.g., computer) readable media and can be any available media that can be accessed by a machine such as the computer 1210. The system memory 1230 may include computer storage media in the form of volatile and/or nonvolatile memory such as read only memory (ROM) and/or random access memory (RAM), and hard drive media, optical storage media, flash media, and so forth. By way of example, and not limitation, system memory 1230 may also include an operating system, application programs, other program modules, and program data.

A user can enter commands and information into the computer 1210 through one or more input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
   in a data storage system comprising data stored as objects and an object data structure, determining, by a system comprising a processor, whether an object is an embedded object based on a first result of evaluating whether a total size of the object is smaller than a first threshold size value; and in response to the object being determined to be the embedded object, wherein the total size of the object is determined to be smaller than the first threshold size value, storing object metadata of the object and object data of the object in the object data structure; and in response to the object being determined not to be the embedded object, wherein the total size of the object is determined to be at least the first threshold size value, determining whether the object is a normal object or an inflated object based on a second result of evaluating whether a size of the object metadata is less than a second threshold size value, wherein the second threshold size value is different than the first threshold size value, wherein the size of the object metadata corresponding to the normal object is smaller than the second threshold size value, and wherein the size of the object metadata corresponding to the inflated object is at least the second threshold size value, and storing at least part of the object in a chunk and storing a pointer to the chunk in the object data structure.

2. The method of claim 1, wherein the object is determined to be the embedded object, and wherein the storing the object metadata of the object and the object data of the object in the object data structure comprises storing the object metadata of the object and the object data of the object in a single entry within the object data structure.

3. The method of claim 1, wherein the object is the normal object, and wherein the storing at least the part of the object to the chunk comprises, storing the object metadata of the object in the object data structure in association with the pointer to the chunk, and storing the object data of the object in the chunk.

4. The method of claim 1, wherein the object is the inflated object, and wherein the storing at least the part of the object to the chunk comprises, storing at least part of the object metadata of the object in the chunk.

5. The method of claim 1, wherein the object is the inflated object, and wherein the storing at least the part of the object to the chunk comprises, storing the object metadata of the object in the chunk and storing the object data in the chunk.

6. A system, comprising:
a data storage system configured to:
store object-related information in an object table and in chunks,
classify objects represented in the object table as embedded objects, normal objects or inflated objects via evaluations of size information of the objects, resulting in classified objects, in which corresponding object data size information for a classified object of the classified objects is based on object metadata size information of the classified object and object data size information of the classified object, wherein
a first evaluation of the evaluations corresponds to a total object data size comprising the object data size information and the object metadata size information, and
a second evaluation of the evaluations corresponds to the object metadata size information, and in response to the classified object being classified as an embedded object as a result of the first evaluation, to store embedded object metadata of the embedded object and embedded object data of the embedded object in the object table; or in response to the classified object being classified as a normal object as a result of the second evaluation, to store normal object data of the normal object in a chunk, store a pointer to the chunk in the object table, and store at least some normal object metadata of the normal object in the object table in association with the pointer; or in response to the classified object being classified as an inflated object as a result of the second evaluation, to store inflated object data of the inflated object in a chunk, store a pointer to the chunk in the object table, and store at least some inflated object metadata of the inflated object in the chunk.

7. The system of claim 6, wherein, in response to the first evaluation indicating that the total object data size is smaller than a first threshold value, the data storage system classifies the classified object as the embedded object.

8. The system of claim 6, wherein, in response to the first evaluation indicating that the total object data size is greater than or equal to a first threshold value, and in response to the second evaluation indicating that the object metadata size information is smaller than a second threshold value, the data storage system classifies the classified object as the normal object.

9. The system of claim 8, wherein the data storage system stores all or substantially all of the object metadata of the normal object in the object table in association with the pointer.

10. The system of claim 6, wherein, in response to the first evaluation indicating that the total object data size is greater than or equal to a first threshold value, and in response to the second evaluation indicating that the object metadata size information is greater than or equal to a second threshold value, the data storage system classifies the classified object as the inflated object.

11. The system of claim 10, wherein the data storage system stores all or substantially all of the object metadata of the inflated object in the chunk.

12. The system of claim 10, wherein the data storage system stores at least part of the object metadata of the inflated object in the object data structure.

13. The system of claim 6, wherein the corresponding object data size information of the classified object, comprising the object metadata size information in conjunction with the corresponding object data size information of the classified object, indicates a total object size above a first threshold size value, and further indicates an object metadata size below a second threshold size value, and wherein the data storage system classifies the classified object as the normal object.

14. The system of claim 13, wherein the first threshold size value is different than the second threshold size value.

15. The system of claim 6, wherein the corresponding object data size information of the classified object, comprising the object metadata size information in conjunction with the corresponding object data size information of the classified object, indicates a total object size above a first threshold size value, wherein the corresponding object data size information of the classified object, comprising the object metadata size information, indicates an object metadata size above a second threshold size value, and wherein the data storage system classifies the classified object as the inflated object.

16. The system of claim 15, wherein the first threshold size value is different than the second threshold size value.

17. A non-transitory machine-readable medium, comprising executable instructions that, when executed by a processor, facilitate performance of operations, the operations comprising:
  obtaining an object for storage in a data storage system comprising data storage chunks, the data storage system comprising an object data structure comprising references to the data storage chunks; and
  evaluating object size information for the object, the object size information comprising object metadata size information of the object and object data size information of the object, for use in storing the object based on the evaluating, the evaluating and storing comprising:
    in response to the evaluating the object size information being determined to indicate a total object size below a first threshold value, storing object metadata of the object and object data of the object in the object data structure,
    in response to the evaluating the object size information being determined to indicate a total object size above the first threshold value, and the object metadata size information being determined to indicate that object metadata size is below a second threshold value, storing the object data of the object in a first chunk, storing a reference to the first chunk in the object data structure, and storing at least some of the object metadata of the object in the object data structure in association with the reference; or
    in response to the evaluating the object size information being determined to indicate a total object size above the first threshold value, and the object metadata size information being determined to indicate that object metadata size is above the second threshold value, storing the object data of the object in a second chunk, storing a reference to the second chunk in the object data structure, and storing at least some of the object metadata of the object in the second chunk.

18. The non-transitory machine-readable medium of claim 17, wherein the evaluating the object size information indicates the total object size is above the first threshold value, and the object metadata size information indicates that object metadata size is below the second threshold value, and wherein the storing at least some of the object metadata of the object in the object data structure in association with the reference comprises storing all or substantially all of the object metadata of the object in the object data structure.

19. The non-transitory machine-readable medium of claim 17, wherein the evaluating the object size information indicates the total object size is above the first threshold value, and the object metadata size information indicates that the object metadata size is above the second threshold value, and wherein the storing at least some of the object metadata of the object in the chunk comprises storing all or substantially all of the object metadata of the object in the chunk.

20. The system of claim 6, wherein the first evaluation utilizes a first threshold value and the second evaluation utilizes a second threshold value, and wherein the first threshold value is different than the second threshold value.

* * * * *